(12) United States Patent
Cook et al.

(10) Patent No.: US 11,737,518 B2
(45) Date of Patent: *Aug. 29, 2023

(54) ARTICLE WITH AT LEAST TWO LAYERS

(71) Applicant: NIKE, Inc., Beaverton, OR (US)

(72) Inventors: Christopher S. Cook, Portland, OR (US); Shane S. Kohatsu, Portland, OR (US)

(73) Assignee: NIKE, Inc., Beaverton, OR (US)

(*) Notice: Subject to any disclaimer, the term of this patent is extended or adjusted under 35 U.S.C. 154(b) by 134 days.

This patent is subject to a terminal disclaimer.

(21) Appl. No.: 17/174,603

(22) Filed: Feb. 12, 2021

(65) Prior Publication Data

US 2021/0161252 A1 Jun. 3, 2021

Related U.S. Application Data

(63) Continuation of application No. 16/164,466, filed on Oct. 18, 2018, now Pat. No. 10,918,162.

(Continued)

(51) Int. Cl.
*A43B 23/02* (2006.01)
*A43B 1/04* (2022.01)
(Continued)

(52) U.S. Cl.
CPC ............ *A43B 23/0235* (2013.01); *A43B 1/04* (2013.01); *A43B 1/14* (2013.01); *A43B 23/025* (2013.01);
(Continued)

(58) Field of Classification Search
CPC ............ A43B 23/0235; A43B 23/0215; A43B 23/025; A43B 23/0255; A43B 23/026; A43B 23/0265; A43B 23/027; A43B 1/04
See application file for complete search history.

(56) References Cited

U.S. PATENT DOCUMENTS 5,640,786 A 6/1997 Buyayez
5,894,686 A 4/1999 Parker et al.
(Continued)

FOREIGN PATENT DOCUMENTS

CN 102112018 A 6/2011
CN 104244759 A 12/2014
(Continued)

OTHER PUBLICATIONS

International Search Report and Written Opinion dated Feb. 1, 2019 for corresponding PCT Application No. PCT/US218/056550.
(Continued)

*Primary Examiner* — Ted Kavanaugh
(74) *Attorney, Agent, or Firm* — Banner & Witcoff, Ltd.

(57) ABSTRACT

An upper for an article of footwear may include a first knit layer, a second knit layer, and a third layer located between the first knit layer and the second knit layer, the third layer including a material with a melting point of 150° C. or less, where the first knit layer and the second knit layer are secured via the material of the third layer. A first zone may be included, where the first knit layer, the second knit layer, and the third layer are coextensive in the first zone. A second zone may be included, where the first knit layer, the second knit layer, and the third layer are coextensive in the second zone. The first zone may have a first stretch resistance and the second zone may have a second stretch resistance, where the first stretch resistance is greater than the second stretch resistance.

20 Claims, 11 Drawing Sheets

Related U.S. Application Data

(60) Provisional application No. 62/574,510, filed on Oct. 19, 2017.

(51) Int. Cl.
  *A43B 1/14* (2006.01)
  *B32B 5/02* (2006.01)
  *B32B 7/12* (2006.01)

(52) U.S. Cl.
  CPC .......... *A43B 23/026* (2013.01); *A43B 23/027* (2013.01); *A43B 23/0215* (2013.01); *A43B 23/0255* (2013.01); *A43B 23/0265* (2013.01); *B32B 5/026* (2013.01); *B32B 7/12* (2013.01); *B32B 2307/54* (2013.01); *B32B 2437/02* (2013.01)

(56) References Cited

U.S. PATENT DOCUMENTS

| | | |
|---|---|---|
| 6,094,844 A | 8/2000 | Potts |
| 6,115,948 A | 9/2000 | Mitchell |
| 6,513,381 B2 | 2/2003 | Fyfe et al. |
| 7,596,891 B2 | 10/2009 | Carnes et al. |
| 7,632,239 B2 | 12/2009 | Dar et al. |
| 7,866,066 B2 | 1/2011 | Forbes |
| 8,028,443 B2 | 10/2011 | Case, Jr. |
| 8,857,078 B2 | 10/2014 | Berner, Jr. et al. |
| 8,935,860 B2 | 1/2015 | Torres |
| 8,956,228 B2 | 2/2015 | Shum et al. |
| 9,625,485 B2 | 4/2017 | Oleson et al. |
| 9,642,415 B2 | 5/2017 | Pease et al. |
| 9,734,304 B2 | 8/2017 | Blackadar et al. |
| 10,277,963 B2 | 4/2019 | Case, Jr. |
| 10,455,887 B2 | 10/2019 | London |
| 10,820,656 B2 | 11/2020 | Bonifas et al. |
| 10,918,162 B2 | 2/2021 | Cook et al. |
| 10,959,481 B2 | 3/2021 | Gruben et al. |
| 11,047,706 B2 | 6/2021 | Kong et al. |
| 11,076,655 B2 | 8/2021 | Beers et al. |
| 11,083,240 B2 | 8/2021 | Veracini |
| 11,109,635 B2 | 9/2021 | Molyneux et al. |
| 11,186,930 B2 | 11/2021 | Huffa et al. |
| 2012/0066931 A1* | 3/2012 | Dojan ................ A43B 23/0235 36/83 |
| 2013/0219749 A1* | 8/2013 | Dojan ................ A43B 23/0275 36/83 |
| 2014/0130270 A1 | 5/2014 | Baudouin et al. |
| 2014/0173932 A1* | 6/2014 | Bell ..................... A43B 23/027 36/84 |
| 2015/0282564 A1 | 10/2015 | Meschter et al. |
| 2015/0313316 A1 | 11/2015 | Boucher et al. |
| 2015/0342286 A1* | 12/2015 | Huffman ................ A43B 1/04 36/9 R |
| 2015/0359290 A1* | 12/2015 | Podhajny ................ A43B 1/04 36/9 R |
| 2016/0286898 A1* | 10/2016 | Manz ................ A43B 23/0235 |
| 2017/0027284 A1 | 2/2017 | Craig |
| 2017/0202295 A1* | 7/2017 | MacGilbert ............. A43B 1/04 |
| 2017/0265596 A1 | 9/2017 | Bruce et al. |
| 2019/0116933 A1* | 4/2019 | Cook ................ A43B 23/0255 |
| 2020/0080242 A1* | 3/2020 | Dardinski ................ A43B 1/04 |

FOREIGN PATENT DOCUMENTS

| | | |
|---|---|---|
| CN | 204763687 U | 11/2015 |
| CN | 105996284 A | 10/2016 |
| CN | 106923423 A | 7/2017 |
| CN | 107080317 A | 8/2017 |
| CN | 107105823 A | 8/2017 |
| DE | 102016102792 A1 | 8/2017 |
| EP | 2 649 898 A1 | 10/2014 |
| EP | 3 075 277 A2 | 10/2016 |
| FR | 3 001 616 | 8/2014 |
| WO | WO 2016/077221 A1 | 5/2016 |
| WO | WO 2016/115231 A2 | 7/2016 |

OTHER PUBLICATIONS

Apr. 14, 2021, Johnson, Nine best running pods 2021—tracking fitness through your feet, Gadgets & Wearables, website <<https://gadgetsandwearables/2021/04/14/best-running-pods/>>, 13 pages.

Dec. 14, 2021, KangaROOS Womens Speedleague Mesh Workout Running Shoes, listed on website <<https://www.bhfo.com/products/kanagaroos-womens-speedleague-mesh-workout-running-shoes?variant=41809815339178>>, 2 pages.

Dec. 14, 2021, Nathan Sensor Pocket, REI Co-Op, listed on website, <<https://www.rei.com/product/785888/nathan-sensor-pocket>>, 2 pages.

* cited by examiner

ARTICLE WITH AT LEAST TWO LAYERS

CROSS-REFERENCE TO RELATED APPLICATIONS

This application is a continuation of U.S. patent application Ser. No. 16/164,466, filed Oct. 18, 2018, which claims the benefit of U.S. Provisional Patent Application No. 62/574,510, filed Oct. 19, 2017. All applications listed in this paragraph are hereby incorporated by reference in its entirety.

BACKGROUND

A variety of articles are formed with textiles. As examples, articles of apparel (e.g., shirts, pants, socks, footwear, jackets and other outerwear, briefs and other undergarments, hats and other headwear), containers (e.g., backpacks, bags), and upholstery for furniture (e.g., chairs, couches, car seats) are often at least partially formed with textiles. These textiles are often formed by weaving or interlooping (e.g., knitting) a yarn or a plurality of yarns, usually through a mechanical process involving looms or knitting machines. One particular object that may be formed from a textile is an upper for an article of footwear.

Conventional articles of footwear generally include two primary elements: an upper and a sole structure. The upper is typically secured to the sole structure and forms a void within the article of footwear for comfortably and securely receiving a foot. The sole structure is typically secured to a lower surface of the upper so as to be positioned between the upper and the ground. In some articles of athletic footwear, for example, the sole structure may include a midsole and an outsole. The midsole may be formed from a polymer foam material that attenuates ground reaction forces to lessen stresses upon the foot and leg during walking, running, and other ambulatory activities. The outsole may be secured to a lower surface of the midsole and forms a ground-engaging portion of the sole structure that is formed from a durable and wear-resistant material.

The upper of the article of footwear generally extends over the instep and toe areas of the foot, along the medial and lateral sides of the foot, and around the heel area of the foot. Access to the void on the interior of the upper is generally provided by an ankle opening in a heel area of the footwear. A lacing system is often incorporated into the upper to adjust the fit of the upper, thereby facilitating entry and removal of the foot from the void within the upper. In addition, the upper may include a tongue that extends under the lacing system to enhance adjustability of the footwear.

DETAILED DESCRIPTION

Figure 1:
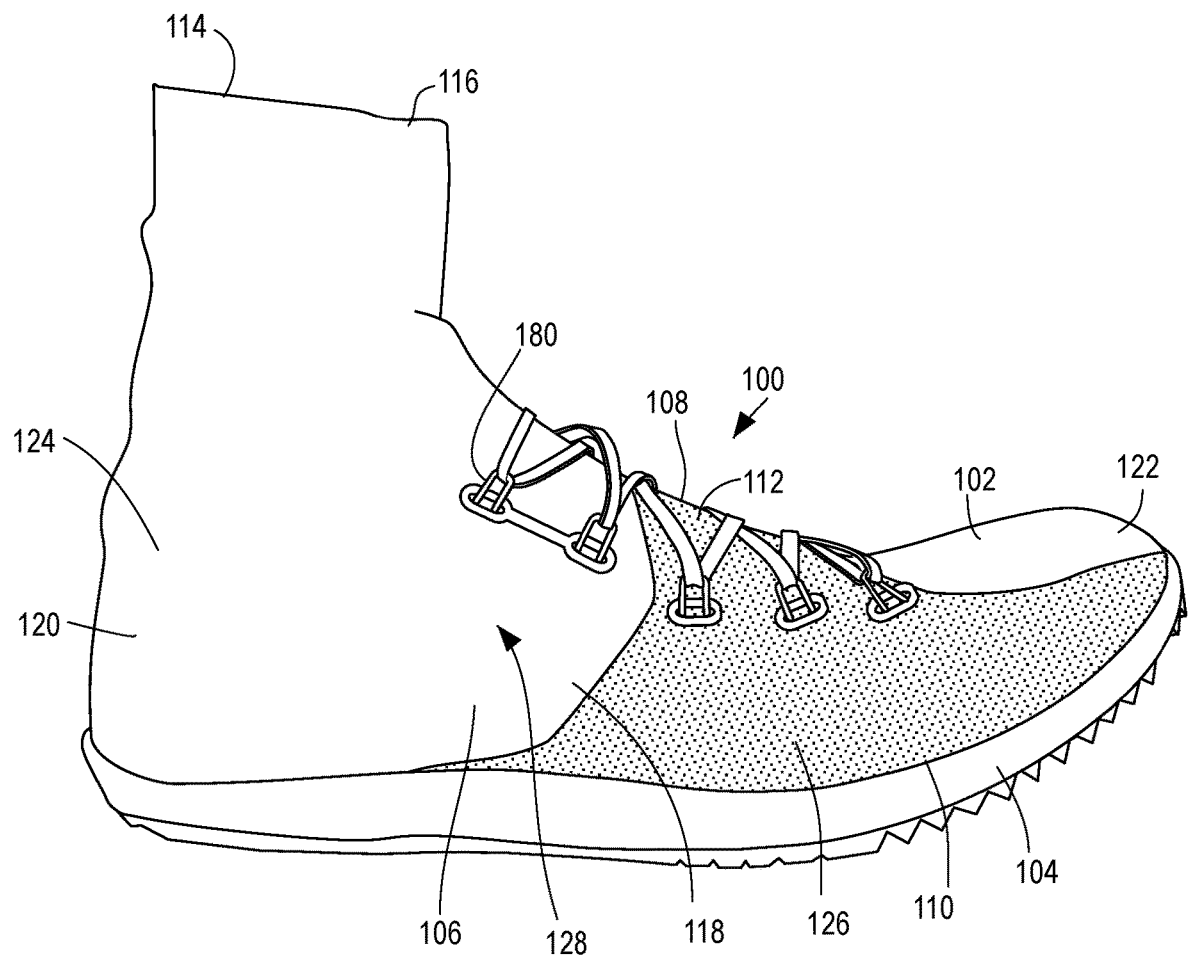
FIG. 1 shows an article of footwear with an upper formed with a first knit layer, a second knit layer, and a third layer therebetween in accordance with the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional fabrication and assembly.

Certain aspects of the present disclosure relate to articles at least partially formed from textiles. One example of an article is an article of apparel (e.g., shirts, pants, socks, footwear, jackets and other outerwear, briefs and other undergarments, hats and other headwear, or the like). The article may be an upper configured for use in an article of footwear. The upper may be used in connection with any type of footwear. Illustrative, non-limiting examples of articles of footwear include a basketball shoe, a biking shoe, a cross-training shoe, a global football (soccer) shoe, an American football shoe, a bowling shoe, a golf shoe, a hiking shoe, a ski or snowboarding boot, a tennis shoe, a running shoe, and a walking shoe. The upper may also be incorporated into a non-athletic shoe, such as a dress shoe, a loafer, and a sandal.

In one aspect, an upper for an article of footwear may include a first knit layer, a second knit layer, and a third layer located between the first knit layer and the second knit layer, the third layer including a material with a melting point of 150° C. or less, where the first knit layer and the second knit layer are secured via the material of the third layer. A first zone may be included, where the first knit layer, the second knit layer, and the third layer are coextensive in the first zone. A second zone may be included, where the first knit layer, the second knit layer, and the third layer are coextensive in the second zone, and where less of the material of the third layer, by mass per unit surface area, is located in the second zone than in the first zone. The first zone may have a first stretch resistance and the second zone may have a second stretch resistance, where the first stretch resistance is greater than the second stretch resistance.

In this and/or another aspect, an upper for an article of footwear may include a first knit layer, a second knit layer, and a third layer located between the first knit layer and the second knit layer, the third layer including a material with a melting point of 150° C. or less. A support member may be located between the first knit layer and the second knit layer, where the first knit layer, the second knit layer, the third layer, and the support member are coextensive at least in a first zone of the upper, where at least one of the first knit layer and the second knit layer are secured to the support member via the material of the third layer, and where the support member extends across a throat area of the upper.

In this and/or another aspect, an upper for an article of footwear may include a first knit layer, a second knit layer, and a third layer located between the first knit layer and the second knit layer. The third layer may have a first porous structure in at least a first zone with a first set of apertures for providing the first zone with a first stretch resistance, where the third layer includes a second porous structure in at least a second zone with a second set of apertures for providing the second zone with a second stretch resistance, and where the first stretch resistance is at least 10% greater than the second stretch resistance.

In this and/or another aspect, a method for forming an upper for an article of footwear may include one or more of the following steps: forming a first knit layer, forming a second knit layer, placing a third layer in contact with the first knit layer, where the third layer includes a material with a melting point of 150° C. or less, placing the second knit layer in contact with the third layer such that the third layer is located between the first knit layer and the second knit layer, and heat-processing the material of the third layer to secure the third layer to the first knit layer via the material of the third layer.

Referring to FIG. 1, an article of footwear 100 is generally depicted as including an upper 102 secured to a sole structure 104. The upper 102 may include a lateral side 106 and a medial side 108. The area of the shoe where the sole structure 104 joins the upper 102 may be referred to as the biteline 110. The upper 102 may be joined to the sole structure 104 in a fixed manner using any suitable technique, such as through the use of an adhesive, by sewing, etc. It is contemplated that the upper 102 may extend partially or completely around the foot of a wearer and/or may be integral with the sole.

In some embodiments, the sole structure 104 includes a midsole (not shown) and an outsole. The article of footwear 100 may additionally include a throat area 112 and an ankle opening 114, which may be surrounded by a collar 116 and may lead to a void (not shown). The void of the article of footwear 100 may be configured to accommodate a foot of a person. The throat area 112 is generally disposed in the mid-foot area 118 of the upper 102. The mid-foot area 118 is generally an area of the upper 102 located between a heel area 120 and a toe area 122.

A tongue may be disposed in the throat area 112 of the shoe, but a tongue is an optional component. The tongue may be any type of tongue, such as a gusseted tongue or a burrito tongue. If a tongue is not included, the lateral and medial sides of the throat area 112 may be joined together. In some embodiments, the article of footwear 100 may include an optional fastening element, such as a lace (which may be associated with lace apertures). Any suitable type of fastening element may be used.

At least a portion of the upper 102, and in some embodiments substantially the entirety of the upper 102, may be formed of a knitted component 124. The knitted component 124 may additionally or alternatively form another element of the article of footwear 100, such as an underfoot portion, for example. The knitted component 124 may have a first side facing the void of the article of footwear 100 and a second opposite facing side, which may form an outer surface 128. The first side and the second side of the knitted component 124 may exhibit different characteristics (e.g., the first side may provide abrasion resistance and comfort while the second side may be relatively rigid and provide water resistance). The knitted component 124 may be formed as an integral one-piece element during a knitting process, such as a weft knitting process (e.g., with a flat knitting machine or circular knitting machine), a warp knitting process, or any other suitable knitting process. That is, the knitting process may substantially form the knit structure of the knitted component 124 without the need for significant post-knitting processes or steps. Alternatively, two or more portions of the knitted component 124 may be formed separately as distinct integral one-piece elements and then the respective elements attached. In some embodiments, the knitted component 124 may be shaped after the knitting process to form and retain the desired shape of the upper 102 (for example, by using a foot-shaped last or jig). The shaping process may include attaching the knitted component 124 to another object (e.g., a strobel) prior to lasting. However, the present embodiments may advantageously eliminate the necessity of using a strobel.

Forming the upper 102 with the knitted component 124 may provide the upper 102 with advantageous characteristics including, but not limited to, a particular degree of elasticity (for example, as expressed in terms of Young's modulus), breathability, bendability, strength, moisture absorption, weight, and abrasion resistance. These characteristics may be accomplished by selecting a particular single layer or multi-layer knit structure, by varying the size and tension of the knit structure, by using one or more yarns formed of a particular of different materials (e.g., a polyester material, a relatively inelastic material, and/or a relatively elastic material such as spandex), by selecting yarns of particular sizes (e.g., denier), or a combination thereof. The knitted component 124 may also provide desirable aesthetic characteristics by incorporating yarns having different colors, textures or other visual properties arranged in a particular pattern. The yarns themselves and/or the knit structure formed by one or more of the yarns of the knitted component 124 may be varied at different locations such that the knitted component 124 has two or more portions with different properties (e.g., a portion forming the throat area of the upper 102 may be relatively elastic while another portion may be relatively inelastic). In some embodiments, the knitted component 124 may incorporate one or more materials with properties that change in response to a stimulus (e.g., temperature, moisture, electrical current, magnetic field, or light). For example, the knitted component 124 may include yarns formed of a thermoplastic polymer material (e.g., polyurethanes, polyamides, polyolefins, and nylons) that transitions from a solid state to a softened or liquid state when subjected to certain temperatures at or above its melting point and then transitions back to the solid state when cooled. The thermoplastic polymer material may provide the ability to heat and then cool a portion of the knitted component 124 to thereby form an area of bonded or continuous material that exhibits certain advantageous properties including a relatively high degree of rigidity, strength, and/or water resistance, for example.

As shown in FIG. 1, at least a portion of the external surface of the upper 102 may be formed with the knitted component 124, which may define an outer knit layer (herein referred to as a first knit layer 130) with an outer surface 128 at least partially forming the external surface of the upper 102. As described in more detail below (but not depicted in FIG. 1), a second knit layer 132 may form an inner surface facing the void of the article of footwear and a third layer 134 (which may be non-knit) may be located between the first knit layer 130 and the second knit layer 132.

More or less than three layers may be included. For example, another layer may be provided by the depicted surface element 126, which may cover a portion of the knitted component 124 such that it forms at least a portion of the external surface of the upper. The surface element 126 may be formed of any suitable material. For example, the surface element 126 may be formed of a water resistant (e.g., waterproof) material to enhance the overall water resistance of the upper at least at some locations (but while also allowing sufficient breathability certain locations, for example). The surface element 126 may also advantageously cover the knitted component 124 at locations that typically experience contact with external elements during normal use. This may protect the knitted component 124 from damage due to abrasion, which may increase the overall durability of the article of footwear. Thus, when included, the surface element 126 may be formed with a material that is relatively durable with respect to the knitted component 124. In one non-limiting exemplary embodiment, the surface element may be a skin or film formed of a thermoplastic polyurethane, which may be applied to the knitted component 124 after formation of the knitted component 124 on a knitting machine.

Figure 2:
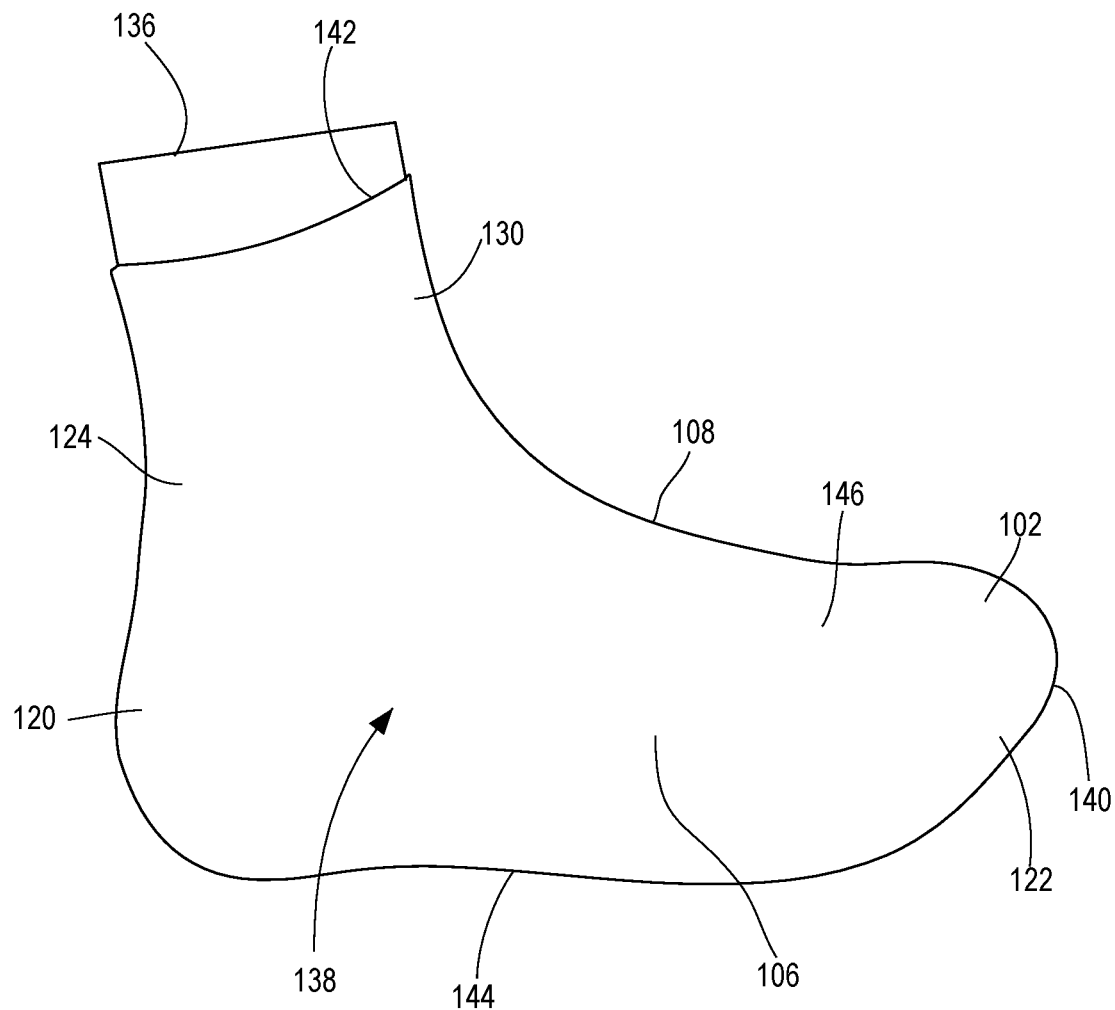
FIG. 2 shows a first knit layer of the upper shown in FIG. 1 when located on a jig, where the first knit layer is formed of a knitted component in accordance with the present disclosure.

FIG. 2 illustrates an example of a last or jig 136, which may be used during the manufacturing of the upper 102. The jig 136 may have a foot-shaped profile and may be substantially flat with two opposite-facing parallel surfaces. In other embodiments, the jig 136 may be substantially foot-shaped in three dimensions. Some examples of suitable jigs and suitable jig characteristics are described in U.S. Patent Application Publication No. 2015/0282564 to Meschter et al., which is herein incorporated by reference in its entirety.

As shown in FIG. 2, the first knit layer 130 (which may be the outer-most knit layer of the upper 102 depicted in FIG. 1) may be the first component placed on the jig 136. The first knit layer 130 may be relatively elastic and compliant to substantially retain the shape of the jig 136. The elasticity and compliance may be achieved by the particular knit structure used to form the first knit layer 130, the types of yarns used, or a combination thereof. It is also contemplated that different portions of the first knit layer 130 may have different knit structures and/or different yarns such that the elasticity (and/or other characteristics) of the first knit layer 130 varies among different areas.

The first knit layer 130 may be inside-out when on the jig 136. That is, with reference to FIG. 2, the outer surface 128 (which is configured to face externally in a completed article of footwear as shown in FIG. 1) may face inward towards the jig 136, and an opposite second surface 138, which may face inward in a completed article of footwear, may initially face outward on the jig 136. Advantageously, this inside-out orientation on the jig 136 may allow for efficient securement of certain elements to an inward-facing surface while preserving the aesthetics of the outer surface 128. However, an inside-out orientation on the jig 136 is not required in all embodiments.

The first knit layer 130 may be manufactured by any suitable knitting process. For example, the first knit layer 130 may be formed on a flat knitting machine or a circular knitting machine. Optionally, a first end 140 forming a toe area may be closed (e.g., closed by a sewn seam), and a second end 142 forming a throat/ankle area may be open to define and ankle opening and to allow access to a void. The jig 136 may be inserted through the opening of the second end 142 after the first knit layer 130 is formed and removed from the knitting machine.

As shown, the first knit layer 130 may be configured to extend substantially around the entirety of the foot, and as such may include an underfoot portion 144 associated with a surface of a plantar aspect of the foot (also known as the sole or bottom of a foot). The first knit layer may also include an overfoot portion 146 associated with the remainder of the foot, including the dorsal surface (i.e., the top of the foot). The underfoot portion 144 may extend from a lateral side 106 of the upper 102 to a medial side 108 of the upper and from the heel area 120 to the toe area 122. The underfoot portion 144 may be configured to attach to a sole structure 104 using any suitable technique, such as through the use of an adhesive, by sewing, bonding, welding, etc.

Figure 3:
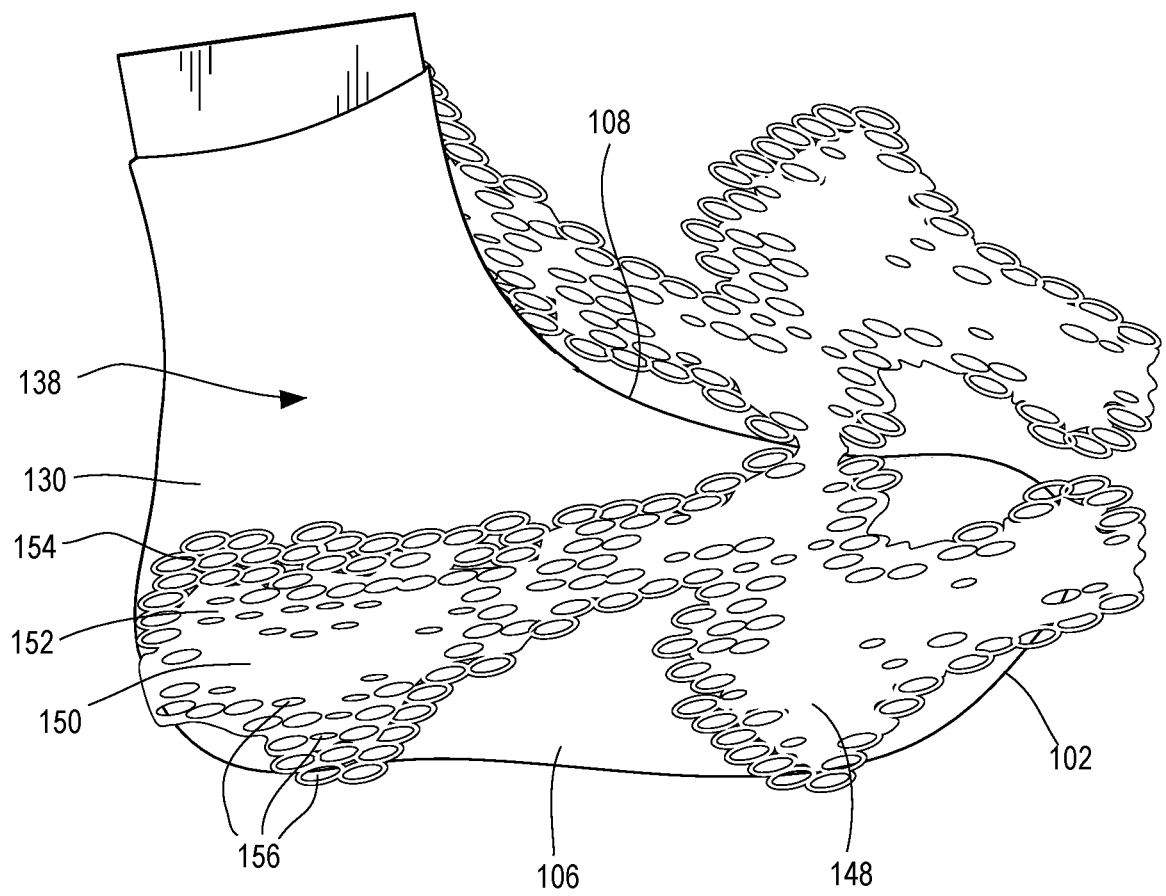
FIG. 3 shows the first knit layer of FIG. 2 when engaged with a support member.

Referring to FIG. 3, in some embodiments, additional components (which may be knitted components, or not) may be engaged with the second surface 138 of the first knit layer 130 to provide the upper 102 with a suitable degree of strength, rigidity, support, and/or other characteristics. For example, FIG. 3 depicts a support member 148 that may engage the second surface 138 of the first knit layer 130. The support member 148 may be formed of a rubber, a plastic, a metal, and/or any other suitable material to provide suitable structural characteristics at least at select locations. As shown, the support member 148 may extend from a heel region to a throat area, and/or from the throat area to the toe area on at least one of the medial side 108 and the lateral side 106 of the upper 102. It is also contemplated that the support member 148 may be configured to provide certain areas with increased water resistance with respect to uncovered areas.

The support member 148 may have different areas with different structures or constructions. For example, referring to FIG. 3, a first area 150 of the support member 148 may be defined by a structure that is relatively dense and/or nonporous. With respect to other areas, the first area 150 may exhibit a relatively high degree of strength, rigidity, water resistance, etc. It may be advantageous to form the support member 148 such that the first area 150 is aligned with certain areas of the upper 102 that typically experience deformation, abrasion, contact with water or another liquid, etc.

A second area 152 may have a structure or construction that is less dense and/or more porous (e.g., having larger apertures 156 (also called "pores" herein) and/or more apertures per unit area) with respect to the first area 150. The second area 152 may be relatively light, breathable, flexible, and/or elastic with respect to the first area 150. Thus, the second area 152 may be located in areas of the upper 102 where low weight, flexibility, and/or elasticity (or other characteristics) are desired, and/or where there is less need for strength, durability, rigidity, or other characteristics more associated with the first area 150.

Similarly, a third area 154 may have a structure or construction different than the construction of the first area 150 and/or the second area 152. In FIG. 3, the third area 154 has more and larger apertures 156 with respect to the second area 152, and thus may exhibit respectively greater degrees of characteristics associated with a highly-porous and/or low-density structure. While only three areas with different structures are described, more or less than three may be included. Further, while the differences in structure between the first area 150, the second area 152, and the third area 154 are primarily depicted and described as differences in density or porosity, other differences may additionally or alternatively be included. For example, the first area 150 could have a first thickness and/or density of a material and the second area 152 and third area 154 may have respectively decreasing thicknesses and/or densities. As another example, the first area 150 could be constructed of a first material and the second area 152 and third area 154 may be constructed of one or more different materials.

Figure 4:
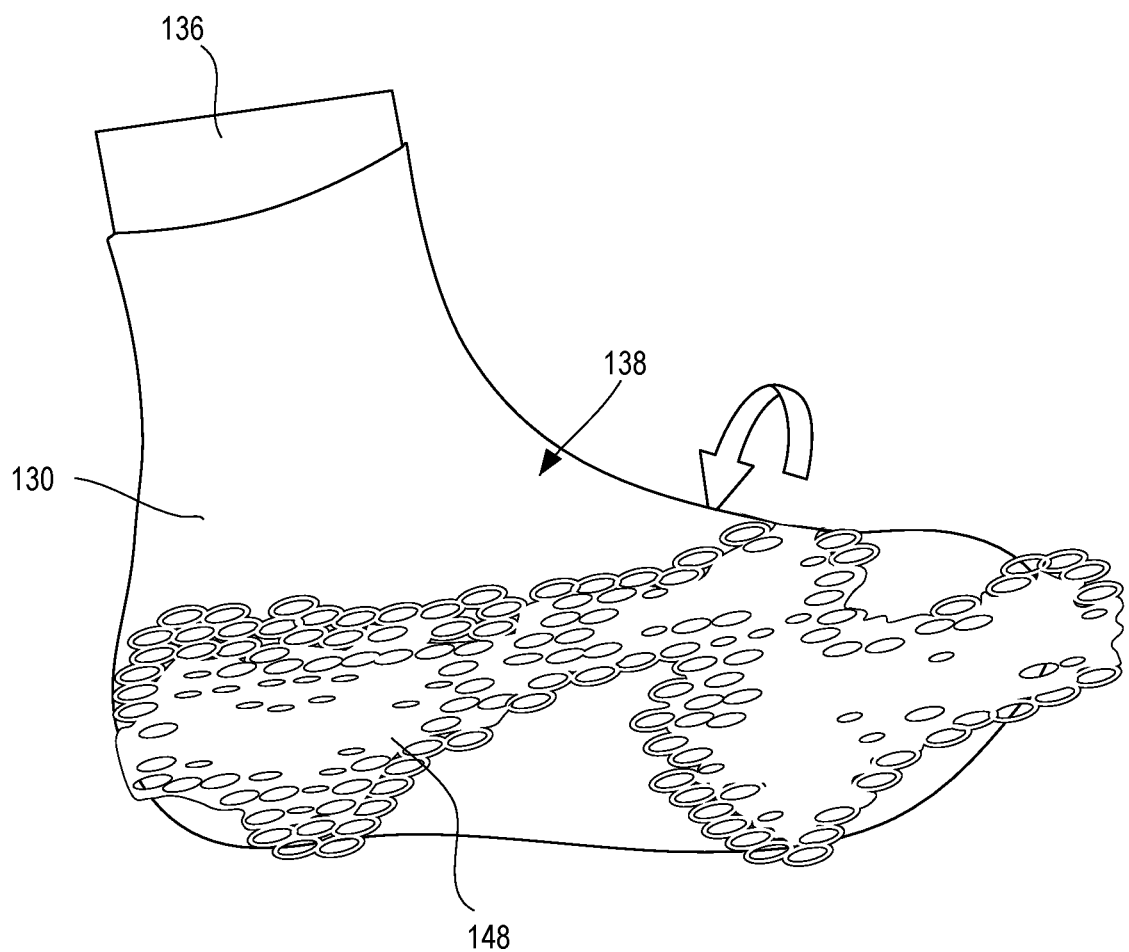
FIG. 4 shows the first knit layer and the support member of FIG. 3, where the support member is secured on a lateral side and a medial side of the inner layer in accordance with the present disclosure.
Figure 5:
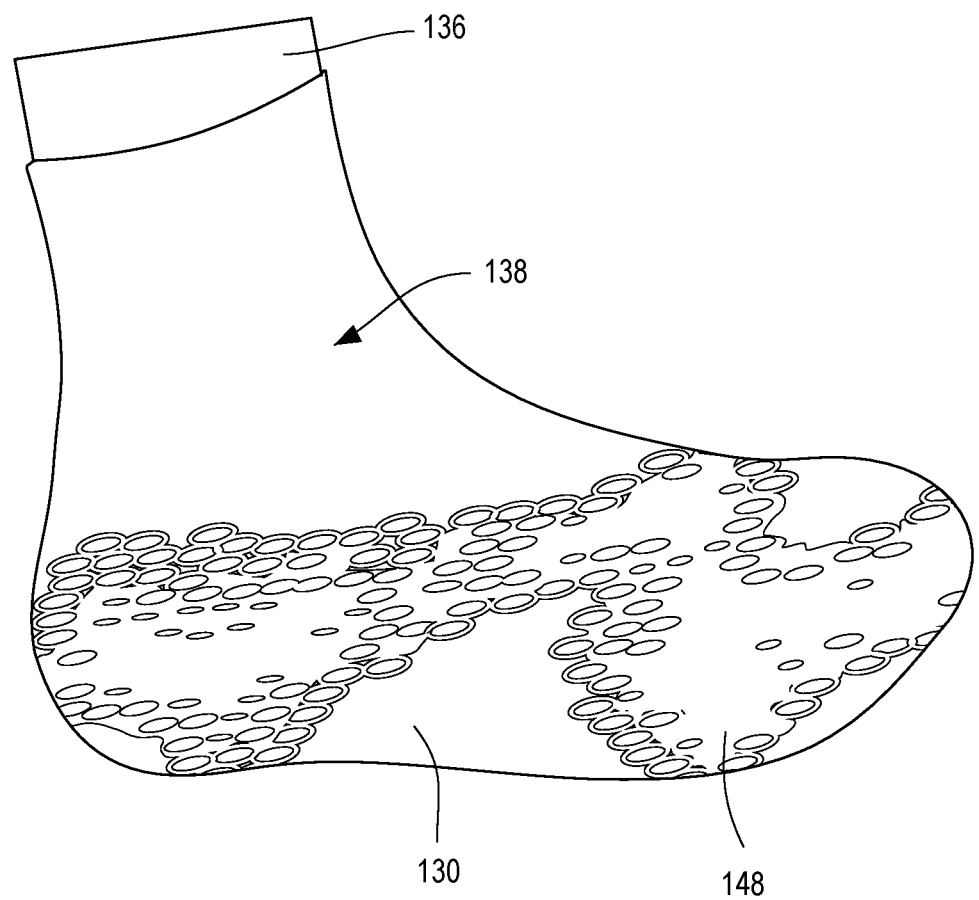
FIG. 5 shows the first knit layer and the support member of FIGS. 3-4, where the support member is additionally secured in a toe area of the upper in accordance with the present disclosure.

FIGS. 4-5 show the support member 148 being placed on and wrapped around the second surface 138 of the first knit layer 130. While it is contemplated that the support member 148 may remain moveable/slidable with respect to the first knit layer 130 when incorporated into an article of footwear, it may be secured in a relatively fixed manner to the second surface 138 of the first knit layer 130 in some exemplary embodiments. The support member 148 may be secured to the second surface 138 through any suitable securement device or method. For example, the support member 148 may be formed of a thermoplastic polymer material that at least partially melts when heated to a particular temperature and then hardens to a solid state when cooled. In one particular embodiment, the support member 148 may include synthetic suede along with 100 micron NASA-T hot melt material sold by Sambu Fine Chemical. While the first knit layer 130 is on the jig 136, the heated thermoplastic polymer material of the support member 148 may be placed into contact with the first knit layer 130 such the support member 148 bonds with the yarns of the first knit layer 130 once the thermoplastic polymer material is cooled to a solid state. Any suitable heating process is contemplated. For example, heat may be applied through the jig 136 (as described in detail in U.S. Patent Application Publication No. 2015/0282564, incorporated above), and/or a heat pressing process may be used as described in U.S. patent application Ser. No. 15/443,808 to Green et al. (filed Feb. 27, 2017, and not yet published), which is herein incorporated by reference in its entirety.

Figure 6:
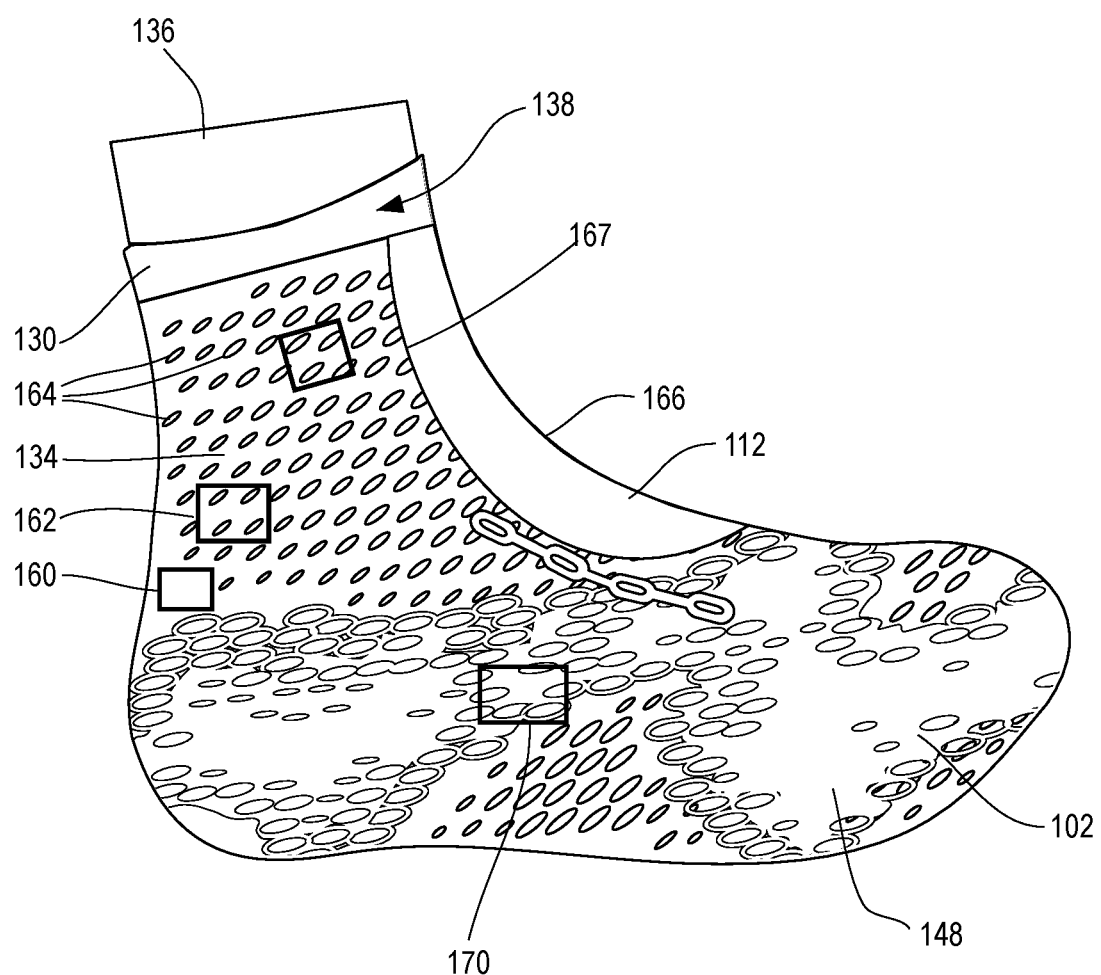
FIG. 6 shows the upper of FIGS. 1-5 further including a third layer formed of a non-knit material in accordance with the present disclosure.

As shown in FIG. 6, another non-knit element or layer may be located adjacent to the second surface 138 and coextensive with the first knit layer 130, such as the depicted third layer 134. The third layer 134 may be formed with a thermoplastic polymer material having a melting point between about 80° C. and about 200° C., such as about 150° C. or less, and more particularly about 120° C. in certain non-limiting exemplary embodiments. When the third layer 134 is formed of a thermoplastic polymer material, it may have a melting point different than a melting point or decomposition point of other components that are also meltable (such as the support member 148, for example). In some embodiments, the third layer 134 may be at least partially formed with a 50 micron NASA-T hot melt material sold by Sambu Fine Chemical. The third layer 134 may be advantageous for reasons similar to those described above with respect to the support member 148. For example, the third layer 134 may provide increased strength, durability, water resistance, etc., while also providing suitable elasticity, flexibility, breathability, etc.

The third layer 134 may be engaged (e.g., secured in a fixed manner or otherwise engaged) with the second surface 138 of the first knit layer 130. Any suitable device or method may be used to apply and engage the third layer 134 to the first knit layer 130. For example, the third layer 134 may be laminated, sprayed, painted, etc., directly or indirectly on the second surface 138. In some embodiments, the third layer 134 may be separately manufactured as a membrane and then placed into contact with the second surface 138 while the first knit layer 130 is on the jig 136. The membrane may then be trimmed or otherwise treated as necessary to be properly sized with respect to the second surface 138. A heat press may then engage the membrane to bond it to the second surface 138. When the jig 136 is substantially flat with two opposite-facing planar surfaces, two separate membranes may be used (e.g., one on each opposite-facing planar surface corresponding respectively with the lateral and medial sides of the upper 102).

The support member 148 is not necessarily included in all embodiments. When the support member 148 is included, the third layer 134 may be located between the support member 148 and the second surface 138 of the first knit layer 130 or alternatively the support member 148 may be located between the third layer 134 and the second surface 138 of the first knit layer 130. In one particular embodiment, the support member 148 may be placed in contact with the second surface 138 of the first knit layer 130 (but not yet permanently secured), and then a membrane forming the third layer 134 may be placed over the support member 148 and the first knit layer 130. Then, a heat processing step may be performed to secure the three components together. For example, the membrane forming the third layer 134 may include a material with a melting point that is lower than a melting or decomposition temperature of the first knit layer 130 and the support member 148. During the heat-processing step, certain areas may be heated to a temperature above the melting temperature of the third layer 134 (but potentially lower than a melting or decomposition temperature of the other components) such that the membrane at least partially melts to bond the first knit layer 130, the support member 148, and the third layer 134 together once cooled. In other embodiments, the melting point of the support member 148 may be the respective lowest. It is also contemplated that the first knit layer 130 may include yarns with a meltable material (e.g., a thermoplastic polyurethane) configured to facilitate bonding.

Similar to as described above with respect to the support member 148, the third layer 134 may have different structures or constructions in different areas, which may provide the upper 102 with different properties in different zones (and herein, a "zone" refers to an area of the upper as a whole). For example, referring to FIG. 6, a first zone 160 may be included where the first knit layer 130 and the third layer 134 are coextensive. Similarly, a second zone 162 may be included where the first knit layer 130 and the third layer 134 are coextensive. The first zone 160 and the second zone 162 may have different properties resulting from differences in the structure or material of the third layer 134 at areas corresponding to different zones of the upper 102 (even when the structure of the first knit layer 130 is consistent).

To illustrate with reference to FIG. 6, in the first zone 160, the third layer 134 may have a relatively low porosity (and may be substantially non-porous). The third layer 134 may be relatively porous at an area corresponding to the second zone 162. Thus, since the third layer 134 may be relatively elastic, flexible, etc., in areas exhibiting a relatively high porosity, the first zone 160 may have a stretch resistance that is greater than a stretch resistance of the second zone 162 (e.g., such that it stretches at least 10% more, such as at least 20% more, and such as at least 30% more when subjected to the same test tensile force (e.g., on the same tensometer with a 5 pound test force)). Similarly, the first zone 160 may have a degree of rigidity, strength, etc., that is high with respect to the second zone 162, and the second zone 162 may be relatively light, breathable, elastic, and/or flexible. Further, a third zone 164 may be included, where the third zone 164 is associated with an area of the third layer 134 having a greater porosity (e.g., with either more apertures per unit area and/or larger apertures) and thus exhibiting an even lesser degree of certain characteristics than the second zone 162. More or less than three zones corresponding with different structures of the third layer 134 may be included. While differences of the structure of the third layer 134 are described primarily with respect to porosity, other differences may additionally or alternatively be included. For example, the third layer 134 may have different thicknesses, material densities, material properties, etc., in different respective areas.

A fourth zone 166 may be included where the first knit layer 130 remains uncovered by the third layer 134 and the support member 148 such that the fourth zone 166 is free of the third layer 134 and the support member 148. At least one of the third layer 134 and the support member 148 may terminate adjacent to an edge 167 of the fourth zone. The fourth zone 166 may be relatively elastic and compliant relative to the above-described zones with the third layer 134 and/or the support member 148 since the elasticity of the first knit layer 130 alone may be greater than the elasticity of the first knit layer 130 combined (coextensively) with the above-described components. Further, when a second knit layer 132 is included (as described below), the first knit layer 130 and the second knit layer 132 may be unsecured to each other in the fourth zone 166 such that they are movable (e.g., slidable) relative to one another in that area, which may be advantageous for suitable comfort and/or for providing a pocket between the first knit layer 130 and the second knit layer 132 for receiving additional elements.

The first zone 160 and the second zone 162 described above may exclude the support member 148, as shown. Other zones may include the support member 148, and the properties of those other zones may differ based on differing structures of the support member 148. For example, a fifth zone 170 may have a greater stretch resistance (e.g., at least 10% greater, such as at least 20% greater, and such as about 40% greater in some embodiments) than the first zone 160 and/or the second zone 162 due to the presence of the support member 148. Multiple zones with different characteristics may include the support member 148. Additionally or alternatively, different structures (e.g., knit structures or yarn properties) of the first knit layer 130 (and/or the second knit layer 132, described below) in certain zones of the upper 102 may also create varying zonal properties.

Figure 7:
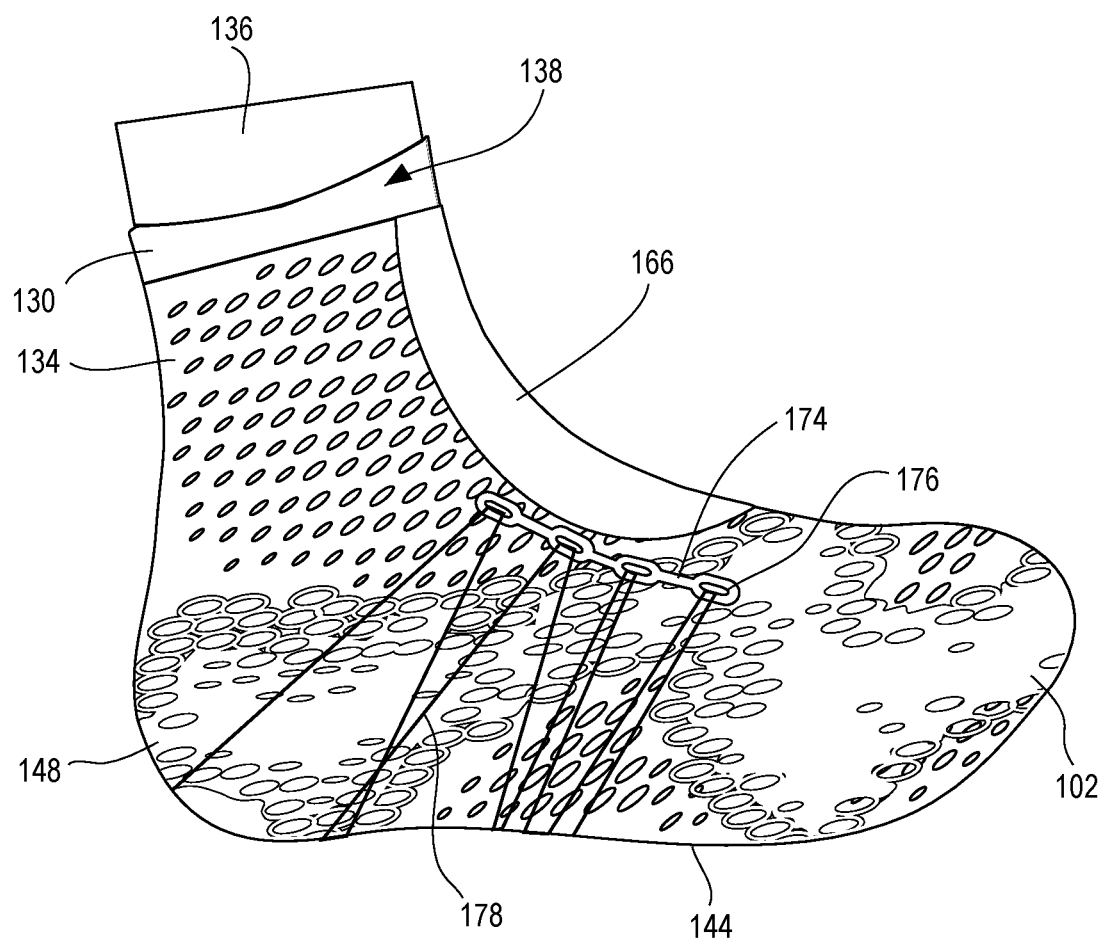
FIG. 7 shows the upper of FIGS. 1-6 further including an auxiliary component and a set of tensile strands in accordance with the present disclosure.

Referring to FIG. 7, additional elements may be secured to the second surface 138 of the first knit layer 130 while the first knit layer 130 is on the jig 136. For example, an auxiliary component 174 (also shown in FIG. 6), which in the depicted embodiment is an elongated device with lace apertures 176, may be substantially fixed with respect to the first knit layer 130. The auxiliary component 174 may be secured via the material of the third layer 134 due to heat processing (as described above), but any other suitable securement device or method is additionally or alternatively contemplated. For example, the auxiliary device may be secured to the first knit layer 130 via an adhesive.

Tensile strands 178 may also be incorporated into the upper 102, as shown. The tensile strands 178 may be attached to and/or may extend through the apertures 176 of the auxiliary component 174. The tensile strands 178 may have a relatively fixed length and may communicate with a shoelace or another fastening element to provide rigidity and structure in the lateral-to-medial direction and to allow a user to sufficiently control the tightness and fit the upper 102 around the foot. In some embodiments, the tensile strands 178 may form at least one loop 180 (shown in FIG. 1) configured to receive the lace, and the at least one loop 180 may extend outside the external surface of the upper 102. The tensile strands 178 may extend beneath and around the underfoot portion 144 and from the medial side to the lateral side of the upper 102 such that a single length of a tensile strand 178 communicates with both sides of the throat area. In other embodiments, at least one of the tensile strands 178 may terminate under the foot, at a location adjacent to the biteline, or at another suitable location.

Figure 8:
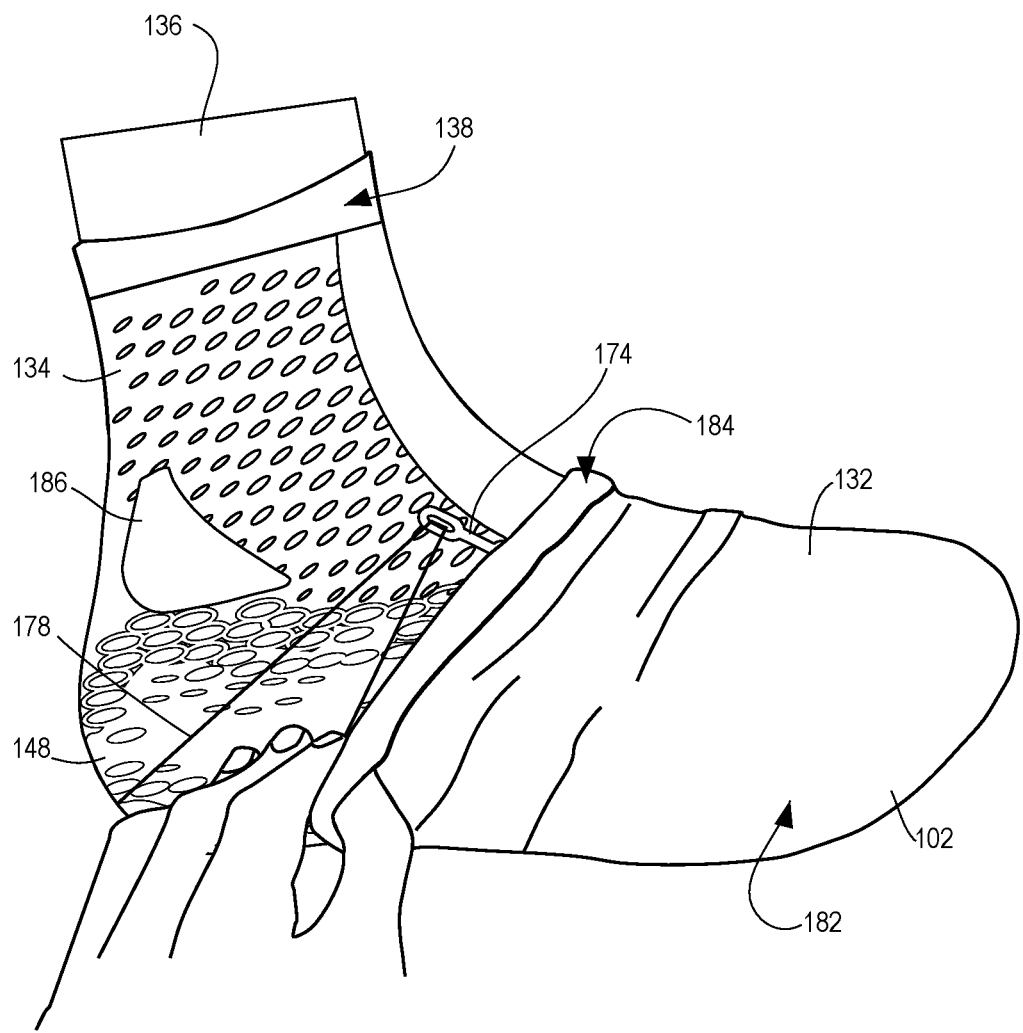
FIG. 8 shows the upper of FIGS. 1-7, further including a second knit layer formed of a knitted component in accordance with the present disclosure.

Referring to FIG. 8, the second knit layer 132 may be placed over the jig 136 (also in an inside-out fashion) with an inner surface 182 of the second knit layer 132 facing outwards. All of the characteristics and advantages associated with the first knit layer 130 described above may also be applicable to the second knit layer 132. Once placed over the jig 136, the second knit layer 132 may be coextensive with the first knit layer 130 and/or the third layer 134. A second surface 184 of the second knit layer 132 may face the second surface 138 of first knit layer 130. As shown, the third layer 134, the support member 148, the auxiliary component 174, the tensile strands 178, and/or any other components (like the additional ankle cushioning element 186) may be located between the first knit layer 130 and the second knit layer 132 once the second knit layer 132 is placed on the jig. Advantageously, the components between the two knit layers may be protected from outside elements and/or hidden from view.

The second knit layer 132 may, like the first knit layer 130, be formed on a flat or circular knitting machine, but it is also contemplated that an alternative second layer may include a non-knitted material. Since the inner surface 182 of the second knit layer 132 may eventually be flipped inside out to form an inner surface facing a void of the upper 102, the second knit layer 132 may include properties that are advantages for contact with a foot. For example, the second knit layer 132 may include particular yarns (e.g., yarns formed substantially of polyester) that are associated with softness, anti-abrasiveness, or other comfort-related characteristics.

Figure 9:
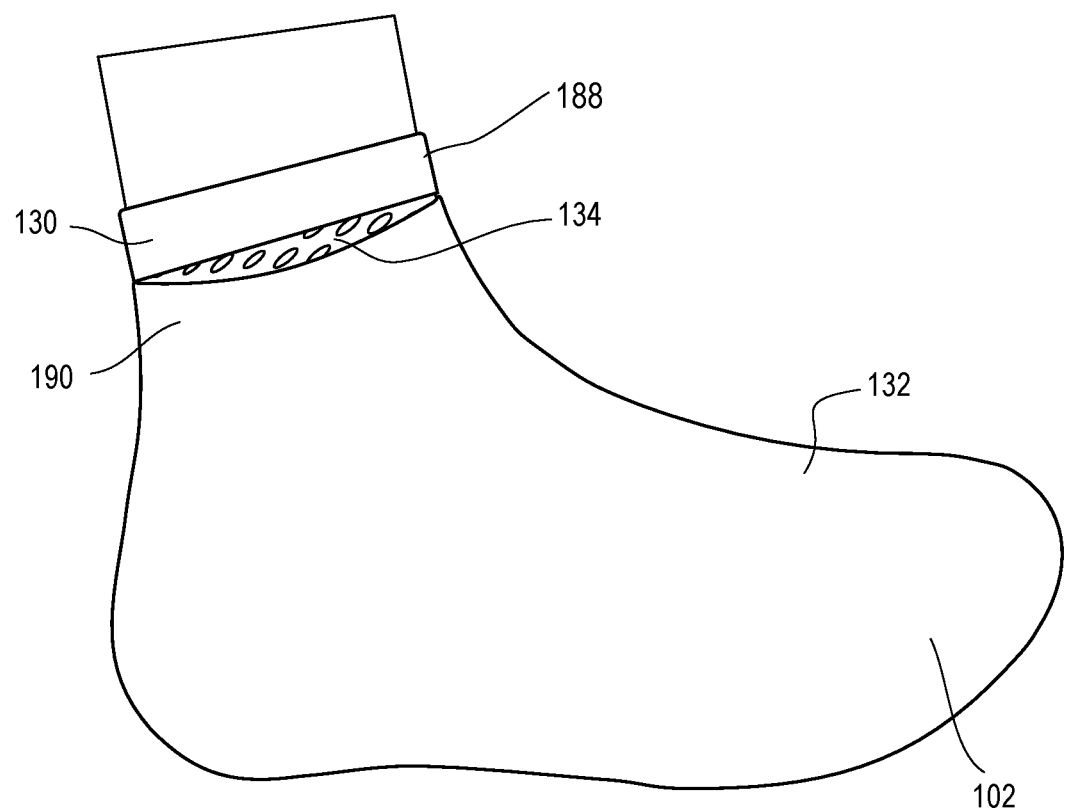
FIG. 9 shows the upper of FIGS. 1-8, where the second knit layer substantially covers the other layers and components from an outside perspective in accordance with the present disclosure.

Referring to FIGS. 8-9, while it is contemplated that the second knit layer 132 may remain movable (e.g., slidable) with respect to the first knit layer 130 and/or the third layer 134 at some locations, the second knit layer 132 may be secured to the first knit layer 130 and/or the third layer 134 in certain locations by any suitable securement device or method. For example, the second knit layer 132 may be sewn, adhered with an adhesive, taped, etc., to an inverted portion 188 of the first knit layer 130 in the ankle area 190. In some embodiments, the securement at the inverted portion 188 may be temporary to hold the second knit layer 132 in place until further processing, but alternatively the securement may be substantially permanent. After the second knit layer 132 is placed over the other elements on the jig 136, the upper 102 may go through another heat-processing step such that the material of the third layer 134 and/or the support member 148 secures to the second knit layer 132 (although at least some areas of the second knit layer 132 may remain unsecured). It is also contemplated that the first heat processing step described above may be skipped when only one heat processing step is necessary for bonding the knit layers (and components located therebetween).

Figure 10:
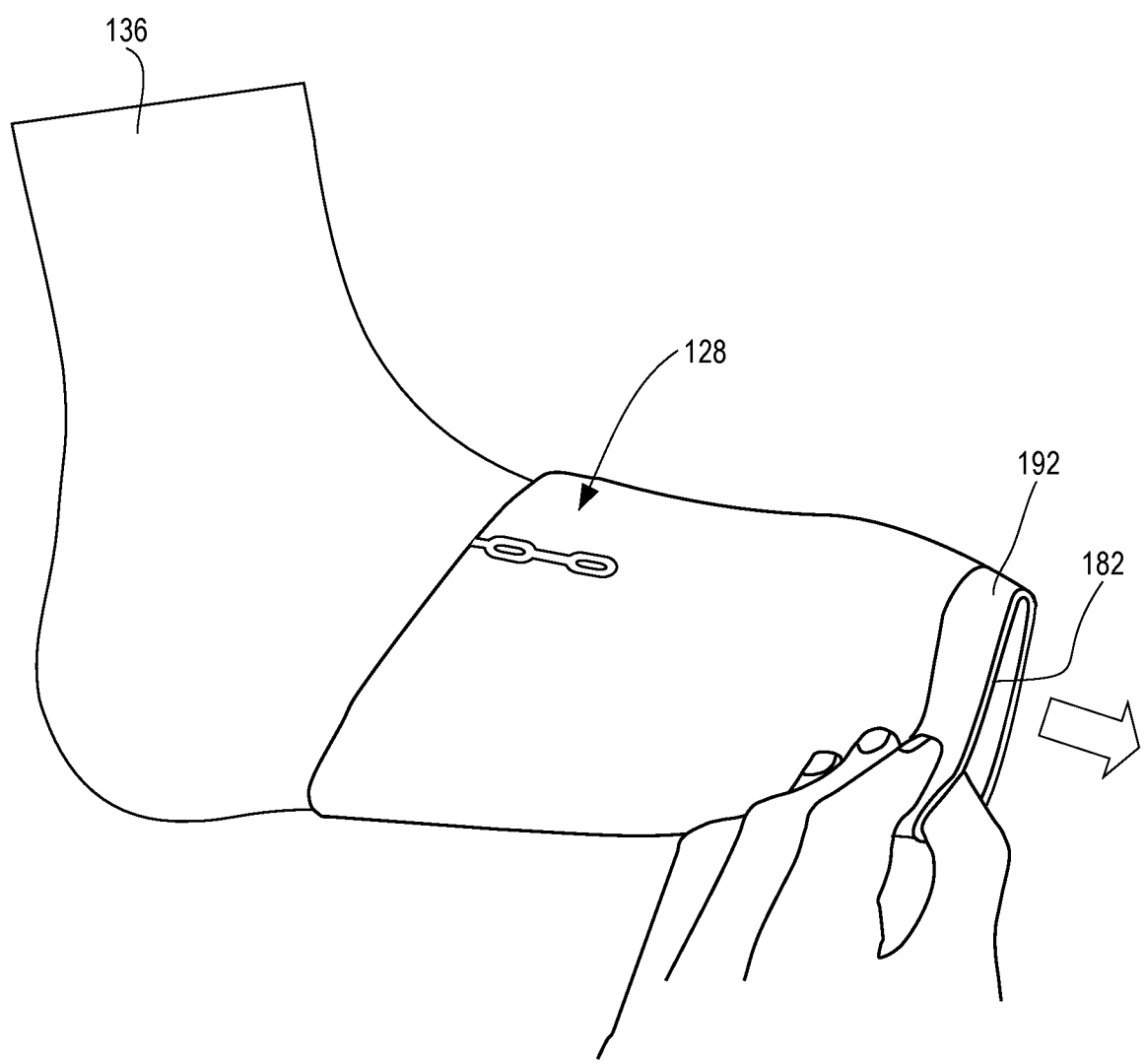
FIG. 10 shows the upper of FIGS. 1-9 as it may appear when being removed from a jig in accordance with the present disclosure.

As shown in FIG. 10, the upper 102 may be removed from the jig 136, for example once some or all manufacturing steps associated with the jig 136 are completed. When, as described above, the first knit layer 130 and the second knit layer 132 are placed on the jig 136 in an inside-out fashion, removing the upper 102 from the jig 136 may include inverting the upper 102 such that it obtains the outside-out orientation that it is configured to embody when incorporated into a final article of footwear. For example, as shown in FIG. 10, removing the upper 102 from the jig 136 may include inverting a portion 192 of the upper 102 at the ankle area 190 and then pulling the portion 192 towards the toe area 122 such that the outer surface 128 of the first knit layer 130 becomes an external surface of the upper 102 and the inner surface 182 of the second knit layer 132 flips into its final orientation to face void of the upper 102. Advantageously, this method of removing the upper 102 from the jig 136 may prevent sliding surfaces made of knitting material against the jig, which may reduce the probability of damage due to abrasion, for example.

Alternative ways of removing the upper 102 from the jig 136 are also contemplated. For example, the upper 102 may be pulled from the toe area 122 such that the upper 102 does not invert (which may be advantageous in embodiments where the second knit layer 132 is placed on the jig 136 first in an outside-out orientation). Additionally or alternatively, the jig 136 may have the capability of reducing its size through mechanical means such that it can transform from its depicted state to a compacted state where it is easily removed from the void of the upper 102. Further, the inversion process, if required by the particular embodiment, does not necessarily need to occur during the removal of the upper 102 from the jig 136 but instead may happen after (or before in some embodiments) the upper 102 is removed from the jig 136.

Figure 11:
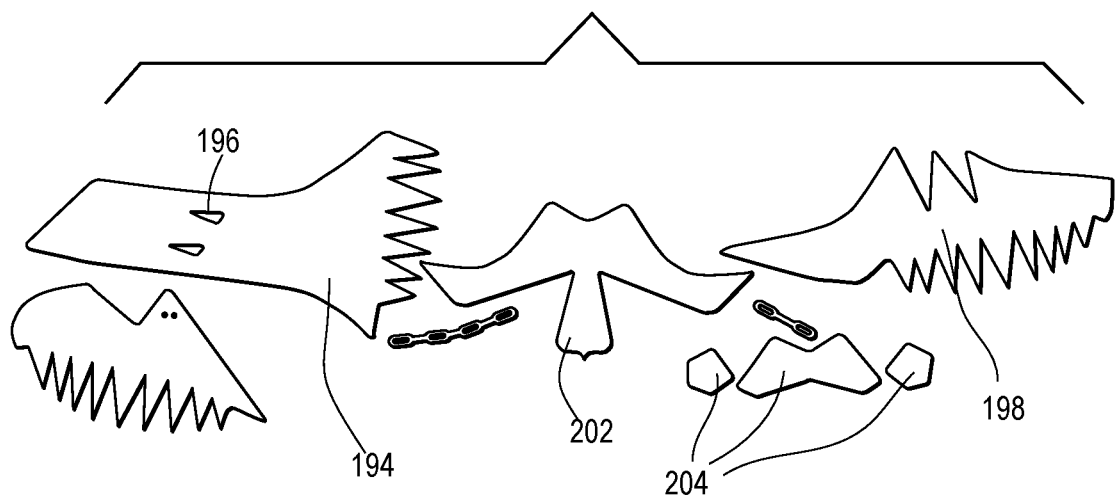
FIG. 11 shows several auxiliary components that may be included in an upper in accordance with the present disclosure.
Figure 12:
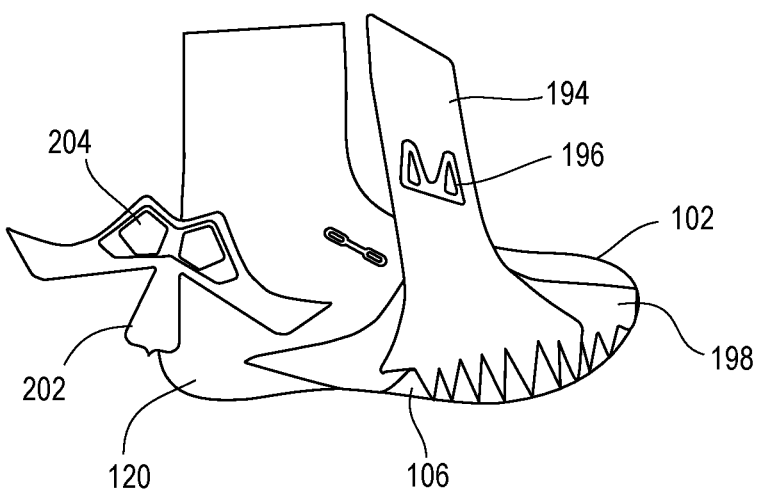
FIG. 12 shows the several auxiliary components of FIG. 11 included in an upper in accordance with the present disclosure.

FIGS. 11-12 show a variety of auxiliary components that may be used in accordance with the present disclosure in addition to, or as an alternative to, the components described above. For example, a large support member 194 may be used and may extend over the throat area from the lateral side 106 of the upper 102 to the medial side of the upper 102 either between the above-described knit layers or at another location (e.g., on the external surface of the outer knit layer). The support member 194 may have openings 196 to provide access to the above-described lace apertures, for example. Similarly, a support member 198 may be located in the toe area of the upper 102. The support members 194, 198 may include any suitable material and may be configured for a variety of particular functions, like providing suitable friction for ball spin during a kick, grip for climbing, protection for construction work, etc. Similarly, a heel element 202 may be configured to provide additional support and protection in the heel area 120 of the upper and/or to house cushioning/protection elements 204. The depicted auxiliary components are included as examples, and a much larger variety of auxiliary components is contemplated than those depicted.

All of the structures and methods disclosed and claimed herein can be made and executed without undue experimentation in light of the present disclosure. While this invention may be embodied in many different forms, there are described in detail herein specific aspects of the invention. The present disclosure is an exemplification of the principles of the invention and is not intended to limit the invention to the particular aspects illustrated. In addition, unless expressly stated to the contrary, use of the term "a" is intended to include "at least one" or "one or more." For example, "a yarn" is intended to include "at least one yarn" or "one or more yarns."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various aspects described herein. It should also be understood that various changes and modifications to the aspects described herein will be apparent to those skilled in the art. Such changes and modifications can be made without departing from the spirit and scope of the invention and without diminishing its intended advantages. It is therefore intended that such changes and modifications be covered by the appended claims.

We claim:

1. An upper for an article of footwear, the upper comprising:
   a first knit layer;
   a second knit layer;
   a third layer formed as a membrane located between the first knit layer and the second knit layer, the third layer including a thermoplastic polymer material with a melting point of 150° C. or less, wherein the first knit layer and the second knit layer are secured via the thermoplastic polymer material of the third layer;
   a first zone, wherein the first knit layer, the second knit layer, and the third layer are coextensive in the first zone; and
   a second zone, wherein the first knit layer, the second knit layer, and the third layer are coextensive in the second zone, and wherein less of the material of the third layer, by mass per unit surface area, is located in the second zone than in the first zone,
   wherein the first zone has a first stretch resistance, wherein the second zone has a second stretch resistance, and wherein the first stretch resistance is greater than the second stretch resistance.

2. The upper of claim 1, further comprising a support member located between the first knit layer and the second knit layer, the support member configured to limit stretch resistance at least in a third zone.

3. The upper of claim 2, wherein the support member includes a second meltable material with a melting point different than the melting point of the thermoplastic polymer material of the third layer, wherein the support member is secured to at least one of the first knit layer and the second knit layer via the second meltable material.

4. The upper of claim 1, further comprising a third zone, wherein the first knit layer and the second knit layer are unsecured in the third zone.

5. The upper of claim 4, wherein the third zone includes a third stretch resistance, wherein the third stretch resistance is less than the first stretch resistance and the second stretch resistance.

6. The upper of claim 1, wherein the third layer includes a plurality of first apertures in the first zone, wherein the third layer includes a plurality of second apertures in the second zone, and wherein the first apertures are smaller on average than the second apertures to provide the first stretch resistance and the second stretch resistance.

7. The upper of claim 1, wherein an inverted portion of the first knit layer is inverted with respect to another portion of the first knit layer adjacent the inverted portion, and wherein the first knit layer and the second knit layer are secured at the inverted portion of the first knit layer.

8. The upper of claim 1, further comprising at least one tensile strand with a length extending between the first knit layer and the second knit layer, wherein the at least one tensile strand forms a loop configured to receive a lace.

9. The upper of claim 1,
wherein the third layer comprises a first set of pores for providing the first zone with the first stretch resistance, and
wherein the third layer comprises a second set of pores for providing the second zone with the second stretch resistance, wherein the first stretch resistance is at least 10% greater than the second stretch resistance.

10. An upper for an article of footwear, the upper comprising:
a first knit layer;
a second knit layer;
a third layer located between the first knit layer and the second knit layer, the third layer including a material with a melting point of 150° C. or less; and
a support member located between the first knit layer and the second knit layer,
wherein the first knit layer, the second knit layer, the third layer, and the support member are coextensive at least in a first zone of the upper,
wherein at least one of the first knit layer and the second knit layer are secured to the support member via the material of the third layer, and
wherein the support member extends: (a) from a heel region to a throat area on a medial side of the upper, (b) from the heel region to the throat area on a lateral side of the upper, (c) from the throat area to a toe area on the medial side of the upper, (d) from the throat area to the toe area on the lateral side of the upper, and (e) across the throat area of the upper.

11. The upper of claim 10, wherein the support member is secured to at least one of the first knit layer and the second knit layer via the material of the third layer.

12. The upper of claim 10, wherein the support member includes a second material with a melting point of 150° C. or less, and wherein the support member is secured to at least one of the first knit layer and the second knit layer via the second material.

13. The upper of claim 10, further comprising a second zone, the second zone including a stretch resistance that is less than a stretch resistance of the first zone.

14. The upper of claim 13, wherein the third layer terminates adjacent the second zone.

15. The upper of claim 10, wherein an inverted portion of the first knit layer is inverted with respect to another portion of the first knit layer adjacent the inverted portion, and wherein the first knit layer and the second knit layer are secured at the inverted portion of the first knit layer.

16. The upper of claim 10, further comprising at least one tensile strand with a length extending between the first knit layer and the second knit layer, wherein the at least one tensile strand forms a loop configured to receive a lace.

17. The upper of claim 10, further comprising a second zone where the first knit layer and the second knit layer are present but the third layer and the support member are not present, wherein the first knit layer and the second knit layer are unsecured to one another in the second zone such that the first knit layer and the second knit layer: (a) are slidable relatively to one another in the second zone or (b) provide a pocket between the first knit layer and the second knit layer in the second zone.

18. The upper of claim 10, wherein the third layer is formed as a membrane from a thermoplastic polymer material with a melting point of 150° C. or less.

19. The upper of claim 1, further comprising a support member located between the first knit layer and the second knit layer, wherein the support member is secured to at least one of the first knit layer and the second knit layer, and wherein the support member extends: (a) from a heel region to a throat area on a medial side of the upper, (b) from the heel region to the throat area on a lateral side of the upper, (c) from the throat area to a toe area on the medial side of the upper, (d) from the throat area to the toe area on the lateral side of the upper, and (e) across the throat area of the upper.

20. The upper of claim 1, further comprising a third zone where the first knit layer and the second knit layer are present but the third layer is not present, wherein the first knit layer and the second knit layer are unsecured to one another in the third zone such that the first knit layer and the second knit layer: (a) are slidable relatively to one another in the third zone or (b) provide a pocket between the first knit layer and the second knit layer in the third zone.

* * * * *